March 12, 1946.  J. J. CAMPODONICO  2,396,456
MULTISPEED GEAR TRANSMISSION
Filed Oct. 15, 1943  3 Sheets-Sheet 3

INVENTOR.
JOHN J. CAMPODONICO.
BY
Castberg & Roemer
ATTY'S

Patented Mar. 12, 1946

2,396,456

UNITED STATES PATENT OFFICE 2,396,456

MULTISPEED GEAR TRANSMISSION

John J. Campodonico, Stockton, Calif.

Application October 15, 1943, Serial No. 506,447

2 Claims. (Cl. 74—330)

This invention relates to a multi-speed gear transmission, and especially to a transmission which is adapted to heavy duty work as in tractors, tanks, trucks, and the like.

The object of the present invention is generally to improve and simplify the construction and operation of transmissions of the character described; to provide a multi-speed gear transmission which is provided with two drive shafts and a single driven shaft to which power is selectively transmitted from either drive shaft; to provide means for reversing the driven shaft so that power may be transmitted thereto either ahead or reverse; to provide means for spinning or synchronizing either drive shaft so that shifting of gears when changing from one speed to another may be accomplished without clashing of gears; to provide a transmission in which it is possible while driving, for instance in low or first speed, to change or mesh the gears in second speed, and then by clutch action to transfer the drive from low to second without noticeable loss of either inertia or momentum; to provide a transmission in which it is possible to have two sets of driving gears of different ratio in mesh while transmitting power through one set; and, further, to provide a transmission in which it is possible to have two sets of gears in mesh, one for ahead drive and one for reverse, and by clutch actuated means selectively to transmit the drive through either.

The invention is shown by way of illustration in the accompanying drawings, in which.

Figure 1:
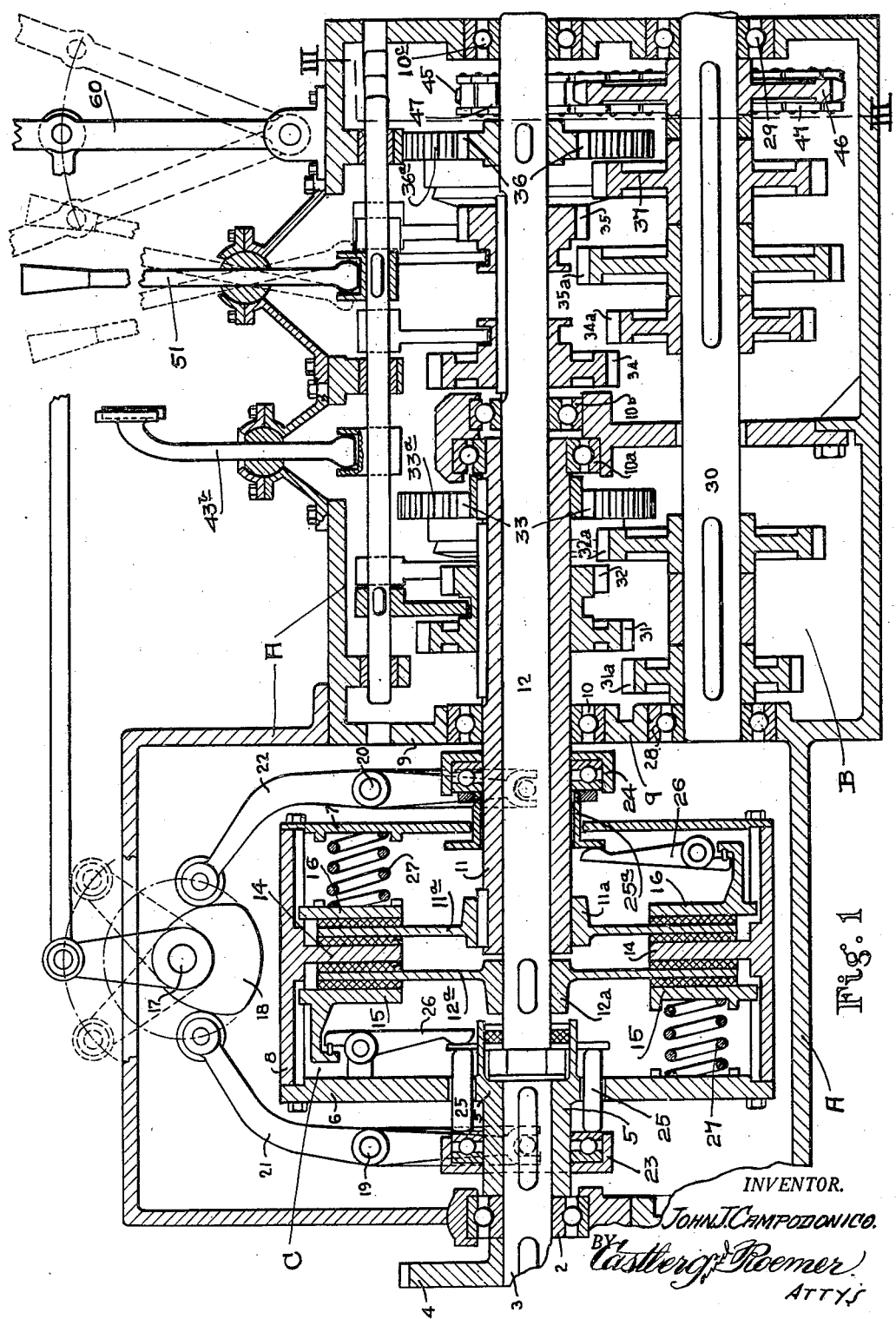
Fig. 1 is a central vertical longitudinal section shown through the transmission.

Referring to the drawings in detail, and particularly to Fig. 1, A indicates a case or housing, in one end of which is mounted a multiple speed gear transmission unit, generally indicated at B, and in the opposite end of which is mounted a compound clutch unit, generally indicated at C. Journaled as at 2, adjacent the clutch unit, is a shaft 3, one end of said shaft having a coupling 4, whereby it is connected with an engine or any other suitable motive power. On the opposite end is secured a hub 5, and forming a part of said hub and driven by the hub is a clutch housing consisting of end plates 6 and 7 and an intermediate housing 8.

Figure 2:
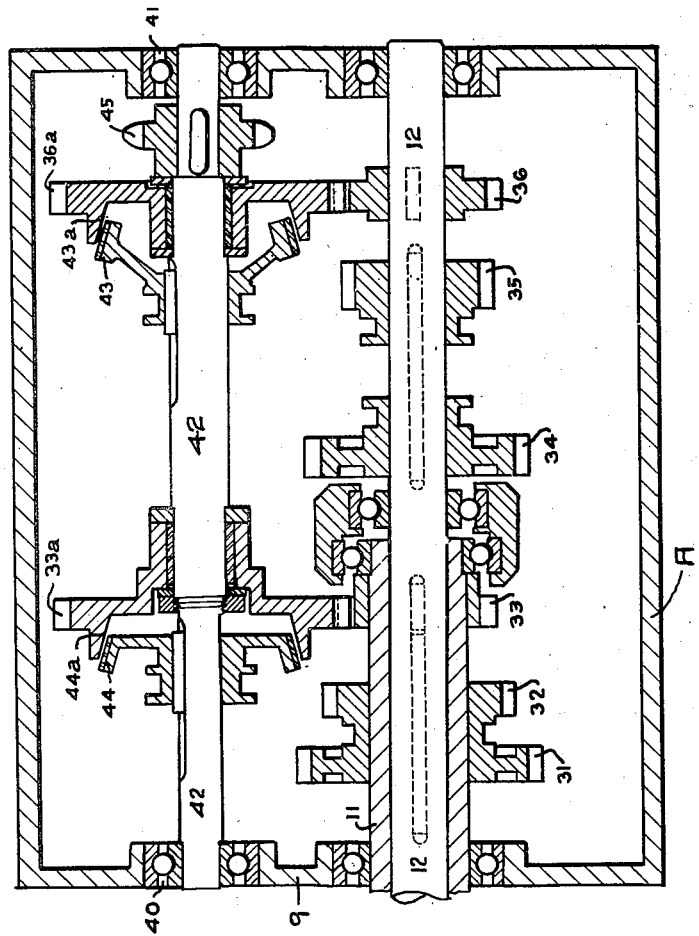
Fig. 2 is a plan section taken on line 2—2 of Fig. 1.

Formed between the clutch unit and the gear transmission unit is a partition or cross wall 9, and journaled therein as at 10 is a sleeve shaft 11, and within the same a shaft 12. The sleeve shaft 11 carries a clutch member 11a and the shaft 12 carries a clutch member 12a. These clutches are in the form of plates and they cooperate with a central plate 14 forming a part of the housing C and with a pair of plates 15 and 16. Mounted above the clutch unit and interiorly of the housing A is a shaft 17, on which is formed a cam 18. Pivotally mounted at opposite ends of the clutch unit as at 19 and 20 are a pair of clutch actuating arms 21 and 22. Their upper ends are provided with rollers which engage the cam 18, while their lower ends are forked to straddle a pair of slidably mounted thrust collars 23 and 24. These collars through pins 25 and a sleeve 25a actuate levers 26, pivoted within the clutch unit, and as the levers 26 actuate the clutch plates 15 and 16, it can be seen that when the cam is swung in one direction, one or another of the clutch plates 15 or 16 will be thrown out of engagement, while one or another of said plates will be thrown into engagement by means of helical compression springs 27. Thus, if power is transmitted through the coupling 4 to shaft 3, said shaft will cause rotation of the clutch unit or the housing C and the plates 14, 15 and 16. If the cam 18 assumes the position shown in Fig. 2, both clutch members 11a and 12a will remain idle, as the cooperating plates 15 and 16 are held out of contact with plate 14. On the other hand, if the cam 18 is swung toward the right, it will swing the clutch arm 22 to the right, thereby further disengaging the clutch 11a. At the same time the clutch arm 21 will also swing to the right, thereby permitting the helical springs 27 to cause engagement of the clutch plate 15 with the clutch member 12a and plate 14, thus transmitting power to the shaft 12. Conversely, by swinging the cam 18 in the left-hand direction, clutch members 14, 12a and 15 will be disengaged and the clutch members 14, 11a and 16 will be engaged and power will then be transmitted to the sleeve shaft 11. Thus, the clutch unit may transmit power to either of the shafts 11 or 12 or it may assume a neutral position with relation to said shafts. The shafts 11 and 12 will hereinafter be referred to as "drive shafts."

The drive shafts 11 and 12, as previously stated, are journaled at one end in the bearing 10, while the opposite ends are journaled in the respective bearings indicated at 10a, 10b, and 10c. Journaled in bearings 28 and 29 and disposed parallel to the drive shafts 11 and 12 is a driven shaft 30. Splined and slidably mounted on the drive shaft 11 are a pair of gears 31 and 32, and secured on the shaft 11 adjacent its inner end is a gear 33. Splined and slidably mounted on the drive shaft 12 are a pair of gears 34 and 35, and secured on the drive shaft 11 is a gear 36. Secured on the driven shaft 30 at points adjacent the gears 31 and 32 are gears 31a and 32a, and secured on the driven shaft at points adjacent the gears 34 and 35 are gears 34a and 35a. Also secured on the driven shaft is a reverse gear 37 which runs in constant mesh with an idler gear 38.

Journaled in bearings 40 and 41, and positioned parallel to the drive shafts and the driven shaft, is a spinner or synchronizing shaft 42, and free to rotate on said shaft are a pair of gears 33a and 36a. The gear 33a is in constant mesh with the gear 33 and the gear 36a is in constant mesh with the gear 36. Splined and slidably mounted on the synchronizing shaft 40 is a clutch member 43 which is adapted to be moved into or out of engagement with a complementary clutch face 43a formed on the gear 36a and splined and slidably mounted on the synchronizing shaft is a second clutch member 44 which is adapted to be moved into and out of engagement with a complementary clutch face 44a formed on the gear 33a. The clutches just referred to are synchronizing clutches and their function will hereinafter be described.

The synchronizing shaft has a sprocket gear 45 secured thereon which is driven from a sprocket gear 46 secured on the driven shaft 30 through means of a sprocket chain 47. Hence, the synchronizing shaft will be driven whenever the driven shaft is driven, and it will remain stationary when the driven shaft is stationary.

Figure 3:
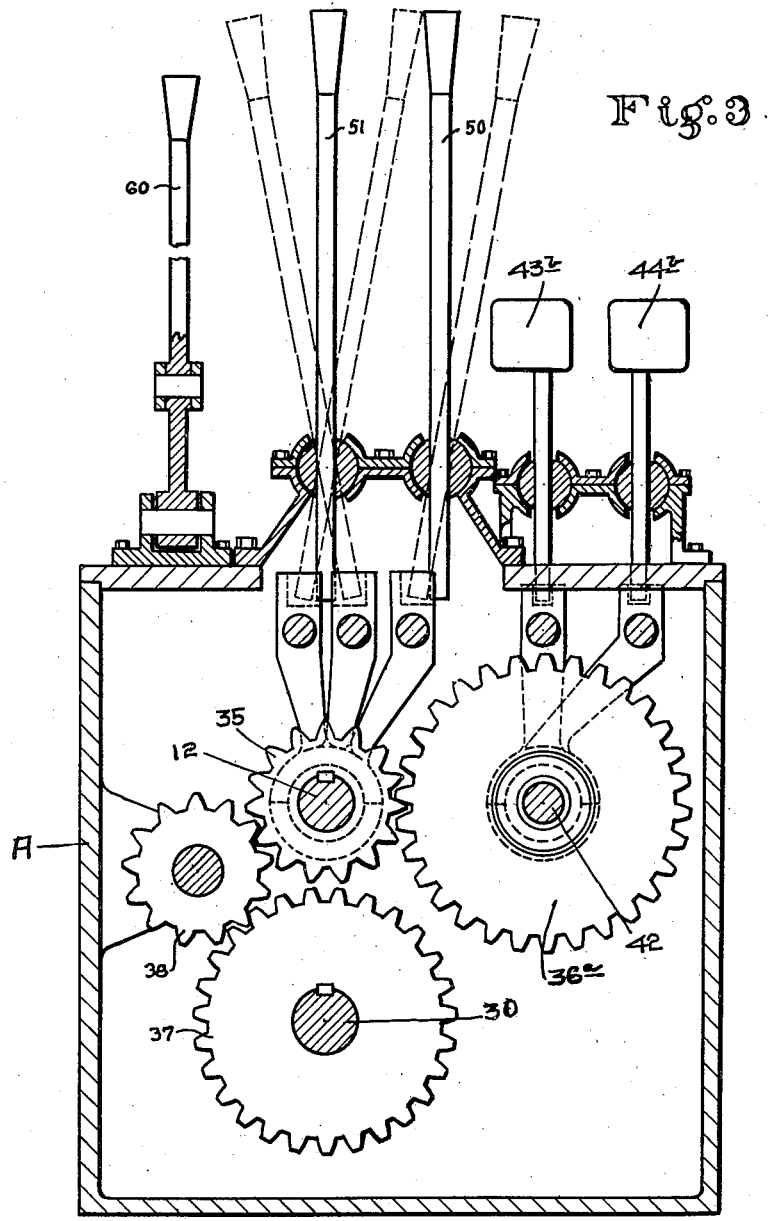
Fig. 3 is an end view in cross section taken on line 3—3 of Fig. 1.

The transmission here shown will always transmit power from one or another of the drive shafts to the driven shaft, and this will in turn transmit power through a propeller shaft or the like to a differential in the usual manner if the transmission is mounted on a vehicle. If the vehicle in which the transmission is mounted is standing still, the cam 18 will assume the position shown in Fig. 1, or neutral position, where both of the drive shaft clutches are out of engagement. Before describing the transmission of power from one or the other of the drive shafts to the driven shaft, it should be noted that the gears are arranged in two groups, the drive or sleeve shaft 11 having two gears 31 and 32 splined and slidably mounted thereon, which are adapted to transmit power either to the gear 31a or 32a. Similarly, the drive shaft 12 has two gears splined and slidably mounted thereon, to wit, the gears 34 and 35 which are adapted to be moved into mesh with the gears 34a and 35a of the driven shaft. It should also be noted that the gear 35 may be moved into engagement with the reverse idler 38 which meshes with the gear 37 so that reverse movement may be transmitted to the driven shaft. Two gear shift levers are employed, one for each group of gears. The gear shift lever indicated at 51 controls the position of gears 34 and 35, while the gear shift lever 51 controls the position of the gears 31 and 32. Hence, if a vehicle in which the transmission is mounted is standing still, it is possible to shift the gear 35 into mesh with the gear 35a if first or low speed is to be transmitted to the driven shaft, or it is possible to mesh the gear 35 with the reversing idler 38 if a reverse drive is to be transmitted to the driven shaft. Similarly, by operating the same gear shift lever, the gear 34 may be meshed with the gear 34a which in this instance is the third speed. The other gear shift lever 50 moves the gears 31 and 32 in unison and will either shift the gear 32 into mesh with the gear 32a, which is second speed, or the gear 31 into mesh with the gear 31a, which is fourth or high speed. The specific mechanism connecting the gear shift levers of the gears to be shifted may be constructed as shown in Figs. 1 and 3, or in any other suitable manner. Such shifting mechanism has become more or less standardized, and for this reason is not specifically described.

If the vehicle in which the transmission is mounted is traveling ahead in low gear or, in other words, when power is being transmitted from shaft 12 through gears 35 and 35a to the driven shaft and it is desired to change to second speed or to the gears 32 and 32a, the synchronizing clutch 44a operated by the gear 33a must be meshed to bring the sleeve shaft 11 up to a speed where the gears 32 and 32a may be meshed without clashing. When they have been meshed, the drive through the low gears 35 and 35a may be continued until the driver is ready to shift the power flow from the gears 35 and 35a to the gears 32 and 32a. This shift of power is accomplished by merely disengaging one clutch and almost instantaneously engaging the opposite clutch. That is, the housing C of the clutch and the plates 14, 15 and 16 are continuously revolving when power is being transmitted. The clutch members 11a and 12a, as previously stated, may assume a neutral position with relation thereto, or either one may be engaged. When power is being transmitted to the drive shaft 12, clutch 12a is engaged, and when power is to be transmitted through the sleeve or drive shaft 11, clutch 11a is engaged. This change from one clutch to another is almost accomplished in the wink of an eye. As a single clutch lever 60 is employed which assumes a vertical position when the clutches are neutral, it is pulled toward the driver when one clutch is engaged, and, conversely, pushed away from the driver when the other clutch is to be engaged. Thus, when driving with one clutch and it is desired to shift over to the other clutch, it is only necessary for the driver to throw the lever quickly from one position to the other. Thus, the clutch which was driving disengages while the other clutch that is to take the drive engages, and a change from one gear to another is accordingly accomplished without any loss of momentum or inertia.

If a vehicle is standing still, and it is desired to go ahead in low, the driver may shift the gear 35 into mesh with the gear 35a and he may thereafter shift the gear 32 into mesh with the gear 32a. He will then engage the clutch 12a to transmit power through the low gears, and when sufficient momentum is obtained he reverses the clutches, thus throwing one out of engagement and the other into engagement, and thereby shifting the power flow from the gears 35 and 35a to the gears 32 and 32a. In other words, two separate pairs of gears of different speed ratio may be in mesh at the same time and power may be selectively transmitted through either set of gears. Again it is not essential that the gears 32 and 32a be meshed at the same time that the gears 35 and 35a are meshed, as it is possible when driving through the gears 35 and 35a, as previously explained, to spin the sleeve shaft 11 by means of one of the synchronizing clutches to bring said shaft up to a synchrone of speed where the gears 32 and 32a may be meshed without clashing.

If power is being transmitted through second speed or, in other words, if you are in gears 32 and 32a and it is desired to go into third speed, or the gears 34 and 34a, the synchronizing clutches 43 and 43a will be engaged to bring the shaft 12 up to a speed where the gears 34 and 34a may be meshed without clashing, after which the driver may take his time to shift from second to third through the clutch action previously described. If he is driving through third speed, or the gears 34 and 34a, and desires to shift into fourth or high, to wit, the gears 31 and 31a, he meshes the synchronizing clutches 44 and 44a and when the sleeve shaft 11 reaches the proper speed the gears 31 and 31a may be meshed, and after they are meshed the clutches may again be reversed to transmit the power flow through said gears to the driven shaft.

From the foregoing it will be noted that two sets of gears of different speed ratio may be in mesh at all times, while power is being transmitted only through one of the meshing sets of gears, and the power may be transmitted selectively through either set of meshing gears by merely shifting the clutches, which, as previously stated, is accomplished in the wink of an eye as it only requires either a pull or push on the clutch lever 60 to change from one clutch to the other. It is also possible with this transmission to mesh the low gear 25 with the reverse idler 38 and to mesh, for instance, the second speed gears 32 and 32a while the clutches are in neutral position and then to transmit power to the driven shaft either ahead or reverse. In place of meshing the second speed gears, the third or fourth speed gears could be meshed, but if the transmission is mounted on a bulldozer or like implement which is constantly going ahead and backing, it is obvious that the lower speed gears are those which should be meshed.

The synchronizing clutches 43 and 44 are in this instance shown as separately actuated. The clutch 43, for instance, is moved into or out of engagement with its complementatry clutch 43a by means of a foot pedal 43b, and the clutch 44 is moved into or out of engagement with its clutch 44a by a foot actuated pedal 44b. The connections between the foot pedal and the clutches 43 and 44 should be of a standard type as shown, or any other connection suitable may be employed.

While this and other features of my invention have been more or less specifically described and illustrated, I wish it understood that various changes in form and construction may be resorted to within the scope of the appended claims, and that the materials and finish of the several parts employed may be such as the experience and judgment of the manufacturer may dictate or varying uses may demand.

What is claimed is:

1. In a transmission of the class described, a housing, a pair of drive shafts and a driven shaft journaled in the housing, a plurality of gears on the driven shaft, a plurality of gears on each drive shaft, means for meshing a gear on one drive shaft with a gear on the driven shaft, a reverse idler gear in constant mesh with a gear on the driven shaft, means for meshing a gear on the other drive shaft with the idler gear to reverse the driven shaft, a clutch element on each drive shaft, and a common clutch mechanism with which the clutch elements are selectively engageable to drive either drive shaft.

2. In a transmission of the class described, a housing, a pair of drive shafts and a driven shaft journaled in the housing, a plurality of gears splined and slidably mounted on one drive shaft, a plurality of gears splined and slidably mounted on the other drive shaft, a plurality of complementary forward-driving gears secured on the driven shaft, a reverse gear on the driven shaft, an idler gear in constant mesh therewith, means for selectively meshing a gear in the first-named drive shaft with a complementary forward-driving gear on the driven shaft, means for selectively meshing a gear on the second-named drive shaft either with a forward driving gear on the driven shaft or with the idler gear, a clutch element on each drive shaft, and a common clutch mechanism with which the clutch elements are selectively engageable to drive either drive shaft.

JOHN J. CAMPODONICO.